July 5, 1927.
W. A. COVENTRY
PULLEY
Filed May 8, 1924
1,634,773
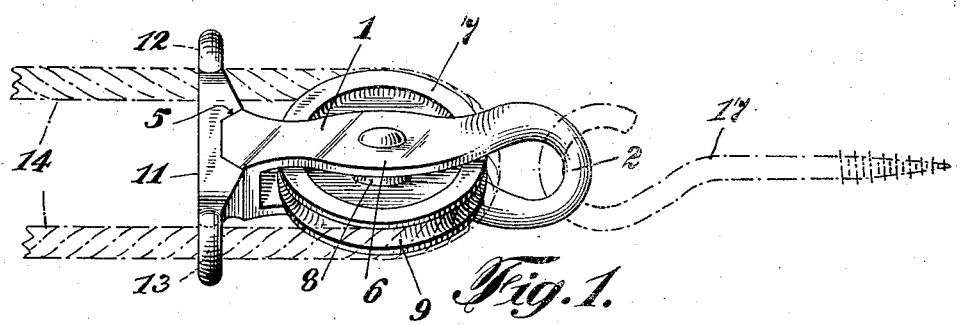
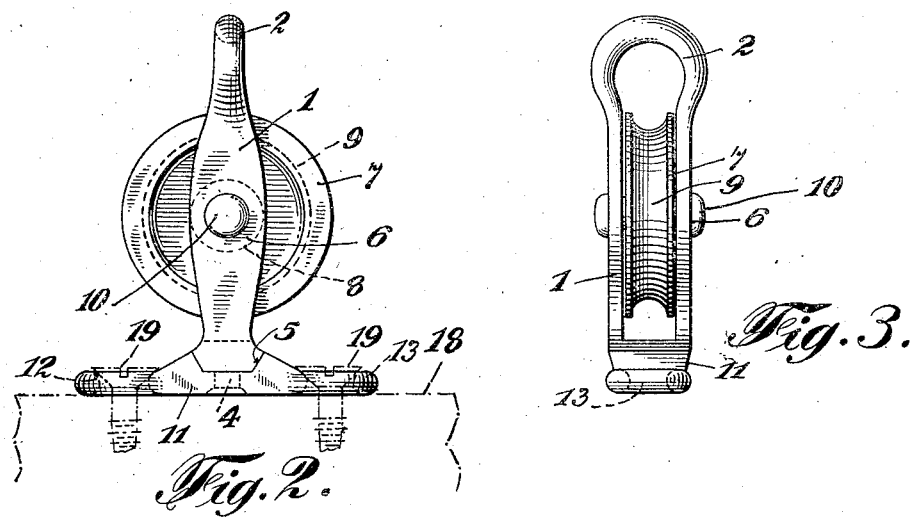
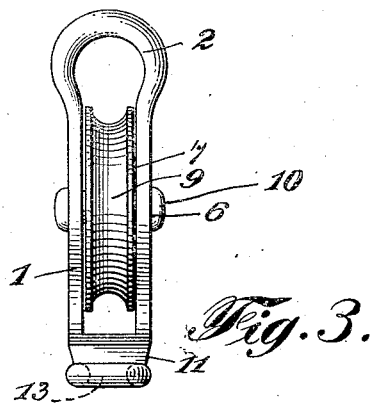
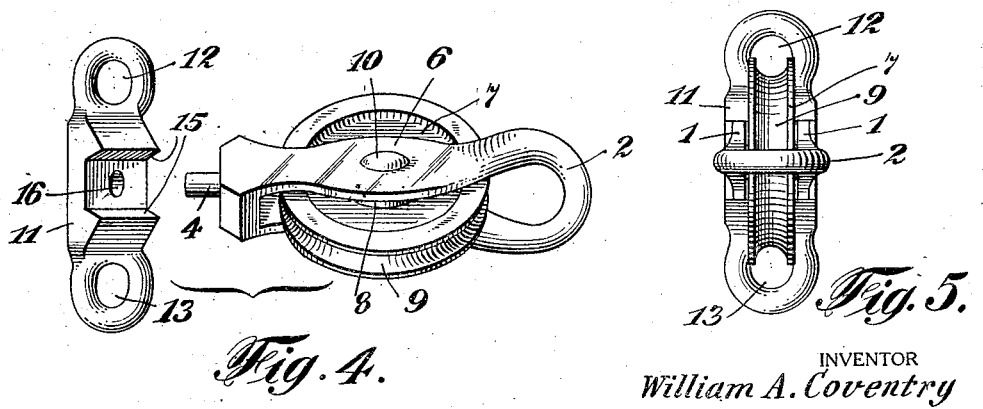
INVENTOR
William A. Coventry
BY
George Ramsey
his ATTORNEY Patented July 5, 1927.

1,634,773

UNITED STATES PATENT OFFICE.

WILLIAM A. COVENTRY, OF LANCASTER, PENNSYLVANIA, ASSIGNOR TO GREY IRON CASTING COMPANY, OF MOUNT JOY, PENNSYLVANIA, A CORPORATION OF PENNSYLVANIA.

PULLEY.

Application filed May 8, 1924. Serial No. 711,787.

This invention relates broadly to pulleys and more specially to a clothes line pulley or the like.

The principal object of the present invention is the production of a simple, sturdy, universal pulley construction.

Another object of the present invention is to provide a cast pulley construction characterized by its simplicity and constructed in such manner as to be capable of being cast with a minimum amount of difficulty.

A more specific object of the present invention is the production of a clothes line pulley or the like of three cast iron parts comprising the pulley, the pulley housing, and the rope guide or base.

A still further object of the present invention is a clothes line pulley or the like in which the pulley frame is adapted to be riveted tightly to the base or rope guide.

Another and important object of the present invention is a pulley of the character specified adapted for multiplicity of uses and in which the rope guide may be utilized as a base by which the pulley may be secured permanently in position on a support.

Other and further objects of the present invention will in part be obvious and will in part be pointed out hereinafter in the specification following by reference to the accompanying drawings throughout which like characters are used to represent like parts.

Figure 1 is a perspective view illustrating the device used as a clothes line pulley;

Figure 2 is a side elevational view of the device;

Figure 3 is an edge elevational view of the device;

Figure 4 is a perspective view showing the parts separated and

Figure 5 is a top view of the pulley.

Referring now to the drawings, the device comprises a body frame or housing 1 which is provided on one end with a rope guide and retaining loop 2 and on the other end with a rivet pin 4. The base of the housing is chamfered with inclined sides as at 5. The housing is expanded adjacent the middle portion 6 where the rivet opening is provided. A pulley wheel 7 is provided with a hub portion 8 and a grooved rim 9, and is mounted to rotate in the housing 1 on a rivet 10 which comprises the axle on which the pulley wheel 7 rotates. The base or rope guide 11 comprises a bar having guide openings 12 and 13 on each end thereof with the walls of the openings rounded in such manner as to form guide rings through which a rope 14 (indicated in Figure 1 in dotted lines) may pass. This rope guide or base 11 is provided with a recess 15 in the middle thereof and with an opening 16 extending from the recess. The rivet pin 4 passes through the opening 16 and the chamfered inclined portions 5 exactly fit recess 15 so that when the rivet pin is expanded or riveted in the opening 16 the parts are securely fastened together with the rope guides 12 and 13 properly aligned relative to the groove 9 in wheel 7, as will be noted from Figure 4.

In the normal use of the device it may be attached to a hook 17 (dotted lines Fig. 1) so that the rope 14 will run through the ring guides and the pulley device will comprise the end support for a double clothes line such as in common use in cities, to enable the user to fasten clothes on the line from an upper window and use the upper run of the rope to move the lower run of the rope to carry the clothes out over an open space for drying. If desired, the pulley may be secured to a support 18 (dotted lines Fig. 2) by the use of wood screws 19 or the like and then the device may be used as an ordinary pulley. The principal and intended use, however, is that illustrated in Figure 1, whereby the base bar comprises a rope guide, as has been explained.

Having thus described my invention, what I claim is:—

1. A pulley device comprising a cast metal guide member provided with a body receiving recess and with openings adapted to act as rope guides; a one piece cast metal body member; and a stud integral with said body member and passing into said guide member, the stud having its end enlarged to secure the two members together and the base of said body member interfitting with said recesses to oppose rotation of the guide member about the stud.

2. A pulley device comprising a cast metal guide member provided with a rectangular body receiving recess and with openings adapted to act as rope guides; a one piece cast metal body member; and a stud integral with said body member and passing into said guide member, the stud having its end enlarged to secure the two members together and said body member having a rectangular base interfitting with said rectangular recess to oppose rotation of the guide member about the stud.

WILLIAM A. COVENTRY.